United States Patent [19]

Palacios et al.

[11] Patent Number: 5,520,774

[45] Date of Patent: May 28, 1996

[54] ULTRASONIC CYLINDER ARM MACHINE

[75] Inventors: Henry C. Palacios; Juan R. Armas; Alfredo Armas, all of El Paso, Tex.

[73] Assignee: Sonobond Ultrasonics, West Chester, Pa.

[21] Appl. No.: 316,856

[22] Filed: Oct. 3, 1994

[51] Int. Cl.⁶ .................................................. B32B 31/16
[52] U.S. Cl. ........................ 156/580.1; 156/73.1; 112/63; 112/258; 112/312
[58] Field of Search ............................... 156/73.1, 580.1, 156/580.2; 264/23, 442; 425/174.2; 112/63, 258, 260, 303, 304, 312, 320

[56] References Cited

U.S. PATENT DOCUMENTS

| | | | |
|---|---|---|---|
| 2,918,027 | 12/1959 | Johnson | 112/258 |
| 3,392,219 | 7/1966 | Smith et al. | 264/23 |
| 3,570,430 | 3/1971 | Fresard | 112/258 |
| 3,734,805 | 5/1973 | Obeda et al. | 156/580.1 |
| 4,524,898 | 6/1985 | Renshaw | 228/1.1 |
| 4,606,964 | 8/1986 | Wideman | 428/152 |
| 4,823,713 | 4/1989 | Ogawa et al. | 112/217 |
| 4,834,010 | 5/1989 | Choi et al. | 112/292 |
| 4,928,611 | 5/1990 | Ogawa | 112/217 |
| 4,931,115 | 6/1990 | Pajunen | 156/73.1 |
| 4,938,817 | 7/1990 | Langley | 156/73.1 |
| 5,087,320 | 2/1992 | Neuwirth | 156/580.2 |
| 5,198,056 | 3/1993 | Stockli et al. | 156/73.1 |
| 5,286,319 | 2/1994 | Gawne | 156/73.1 |

FOREIGN PATENT DOCUMENTS 0089116   5/1984   Japan ..................................... 156/73.1

OTHER PUBLICATIONS

Applications of Ultrasound, Technical Textiles International, Apr., 1993.

*Primary Examiner*—David A. Simmons
*Assistant Examiner*—J. Sells
*Attorney, Agent, or Firm*—John C. Andrade

[57] ABSTRACT

The present invention is an ultrasonic cylinder arm machine which includes a combination of the use of ultrasonics with a cylindrical arm that extends out from the ultrasonic unit and back toward the horn of the ultrasonic unit whereby the machine is especially suited for the manufacture of tube shaped or cylindrical shaped articles such as trouser legs and long sleeved shirt sleeves.

6 Claims, 3 Drawing Sheets

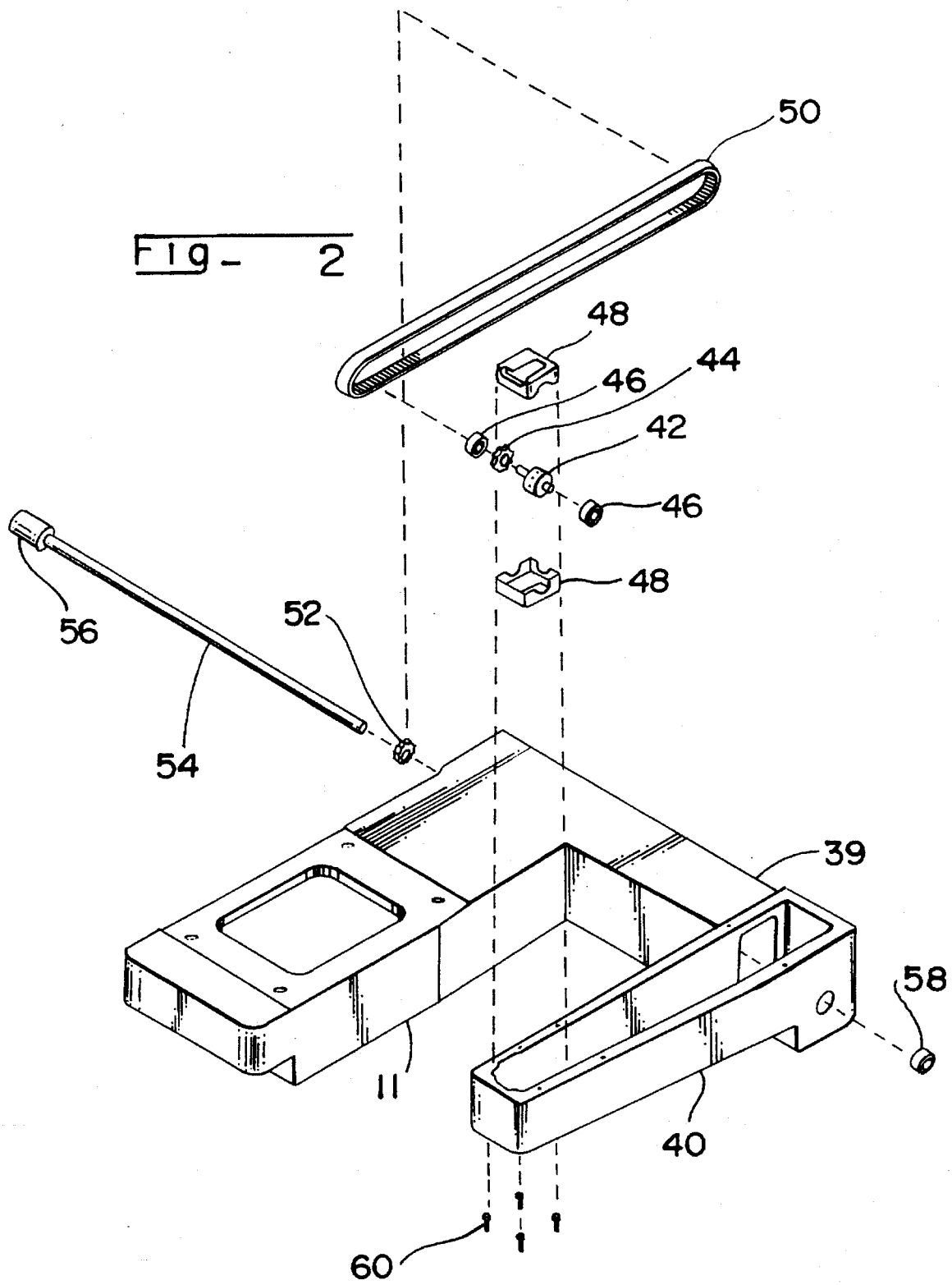

ULTRASONIC CYLINDER ARM MACHINE

BACKGROUND OF THE INVENTION

The present invention relates to an ultrasonic cylinder arm machine and more particularly a cylindrical arm extension machine which allows materials to be easily bonded into cylindrical shapes by using ultrasonics.

Ultrasonics have been used in the production of synthetic materials for a number of years. The advantages in using ultrasonics are that ultrasonics require no consumables, make no holes and can operate at speeds significantly higher than those possible on sewing machines. Materials may be 100 percent synthetic or blends may be used with up to 40 percent of natural fibers. Non-woven, woven, stretch woven or knit thermoplastic materials can be bonded and slit by use of ultrasonics.

The ultrasonic assembly typically contains the following elements: a power supply, a converter, a booster, a horn and an anvil. Ultrasonic vibration is transmitted from the horn to the material, developing frictional heat where they touch. This momentary heat fuses the edges of the fabric. If a cutting edge is used on the anvil, the fabric is cut through and the edge is sealed at the same time.

One object of the present invention is to provide an ultrasonic cylindrical arm machine more suitable for bonding of materials in cylindrical shapes. Ultrasonics are commonly used to make seams and hems in disposal medical products. These include garments, drapes, wipes, face masks, etc. Pattern wheels can be changed to simulate a single, double or triple row of stitches. Extra sealing and a neater appearance results when an edge cutter is used on the same pattern wheel to trim the edge as it is stitched.

Another object of the present invention is to provide an ultrasonic cylinder arm machine that can easily make double-felled seams for tubular shaped fabrics such as shirt sleeves and pant legs. These and other objects of the invention will be apparent to those skilled in this art from the following detailed description of a preferred embodiment of the invention.

BRIEF DESCRIPTION OF THE INVENTION

The ultrasonic cylinder arm machine of the present invention substantially simplifies ultrasonic bonding of cylindrical or tube-shaped fabrics. The cylindrical arm extends out away from the ultrasonic assembly of the machine and an extension of the arm extends back toward the assembly and the ultrasonic horn. The cylindrical arm includes a rotary wheel and a means for driving the rotary wheel, wherein the rotary wheel is directly apart from the horn. The rotary wheel can turn parallel to the extension of the arm or perpendicular to it. The arm and the rotary wheel act as an anvil in the ultrasonic cylindrical arm machine. The extension of the arm can be at a range of different angles and/or arcs but is preferably L-shaped. The extension of the cylindrical arm will typically be a rectangular or square-shaped cross section as shown in the drawings, but can be a variety of shapes suitable for inserting the extension of the cylindrical arm in cylindrical fabrics while they are being bonded. The cylindrical fabrics to be bonded will typically be trouser legs and long-sleeved shirt sleeves, but can also include other articles or types of fabrics.

BRIEF DESCRIPTION OF THE DRAWINGS

The invention will be further described in connection with the accompanying drawings in which the ultrasonic cylinder arm machine of the present invention is shown.

FIG. 2 is a blowup and perspective view of the cylindrical arm of the ultrasonic cylinder arm machine of the present invention.

FIG. 3b is a cross sectional view of a fell-bonded seam of a trouser leg made by the ultrasonic cylinder arm machine of the present invention as shown in FIG. 3a.

DETAILED DESCRIPTION

Figure 3B:
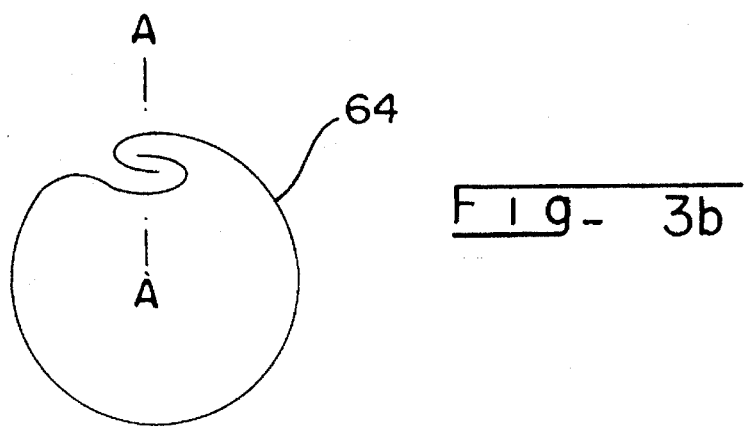

The ultrasonic cylinder arm machine of the present invention addresses the problem of the manufacturing of cylindrical or tube shaped articles such as long sleeved shirt sleeves and trouser legs. The advantages of the present invention are the ease with which the ultrasonic cylinder arm machine can be used to bond the seam of the cylindrical or tube shaped article and also allows the operator to easily make the felled bonded seams as shown in FIG. 3a and FIG. 3b.

Figure 1:
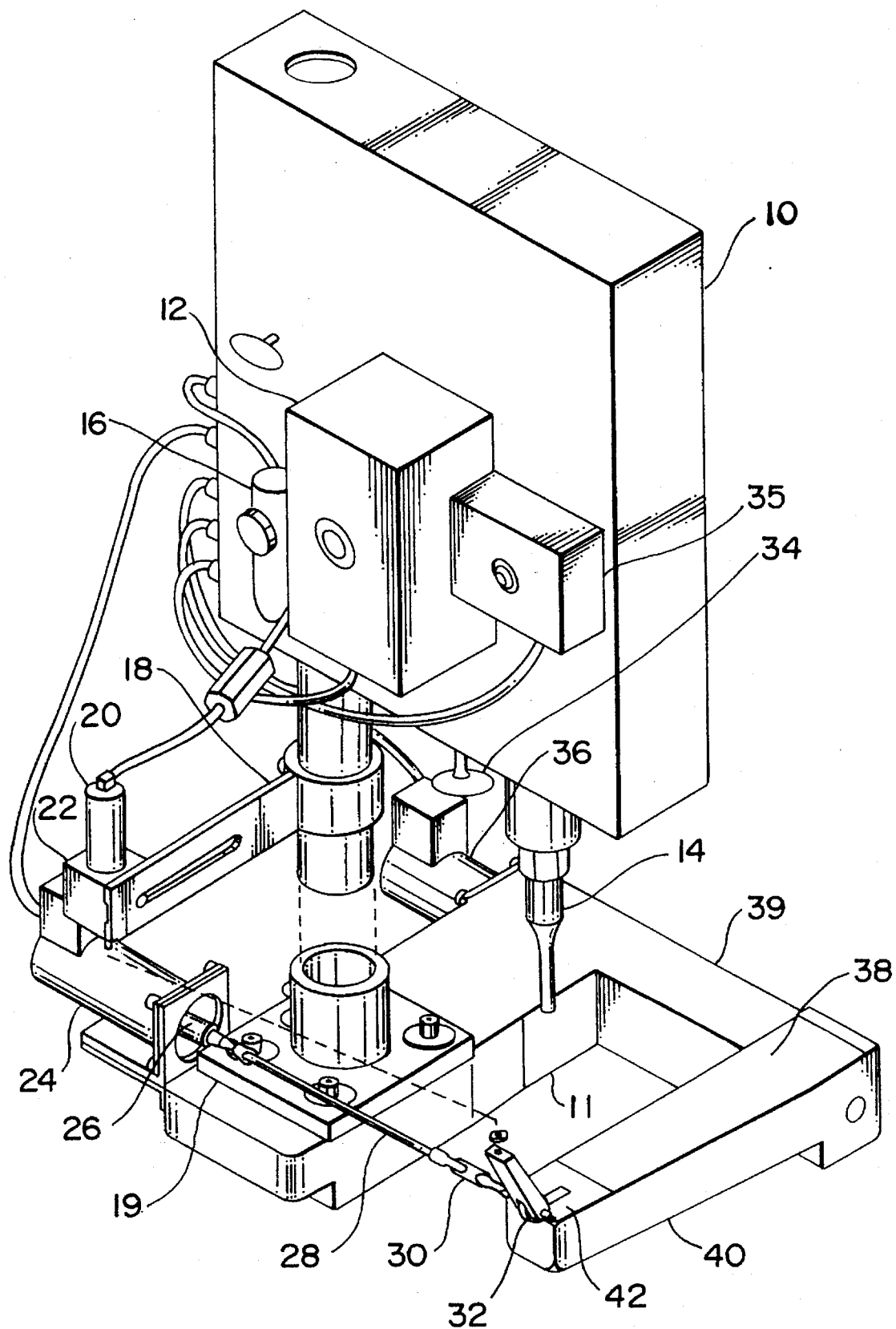
FIG. 1 is a perspective view of the ultrasonic cylinder arm machine.

FIG. 1 shows the ultrasonic cylinder arm machine. The exterior of the body of the ultrasonic assembly 11 is shown comprising the head 10, the main controller 12, the horn 14, the air gauge 16, the puller collar assembly 18, and the mounting block 19. The cylindrical arm 39 is shown extending out away from the ultrasonic assembly 11 and the extension of the cylindrical arm 40 is shown extended back toward the horn 14 of the ultrasonic assembly 11. Fabrics that are fed across the cylindrical arm are pulled by the puller assembly 32 which is shown in FIG. 1 and is comprised of the air piston 20, piston block 22, puller motor 24, adapter 26, flexible puller shaft 28 and the U-joints 30. Within the extension of the cylindrical arm 40, is the drive wheel 42 which is partially exposed and not covered by the main cover 38 of the extension of the cylindrical arm 40. The drive wheel 42 is driven by the feed motor 36, controlled by the feed controller 35 and adjusted by the adjustment knobs 34. The puller assembly is used to pull the fabric to be bonded across the cylindrical arm and the fabric is in addition driven across the cylindrical arm by the drive wheel 42. The configuration of the arm allows the operator to easily place the tube shaped article to be bonded around the cylindrical arm, and pulled across it. The article to be bonded can be pulled down the extension of the cylindrical arm as it is being bonded or it can be pulled up the extension of the cylindrical arm after it is bonded. The extension of the cylindrical arm 40 extends out from the base of the ultrasonic assembly 11 at a right angle and the cylindrical arm extension 40 of the cylindrical arm 39 turns at a right angle back toward and under the horn 14.

FIG. 2 shows the construction of the cylindrical arm 39 and the mechanism used in this particular embodiment to drive the drive wheel 42. The drive wheel 42 is attached to the drive pulley 44 with two set screws and the bearings 46 are then housed along with the drive wheel 42 and the drive pulley 44 within the bearing carrier 48. This assembly is then held within the extension of the cylindrical arm 40 by the set screws 60. The drive wheel 42 is driven by the drive belt 50. The drive belt 50 is located within the extension of the cylindrical arm 40 and is looped over the drive pulley 44 and the drive pulley 52 as shown in FIG. 2. The drive pulley 52 is attached to the drive shaft 54 and is adjacent to the bearing 58. The set screw 56 of the drive shaft 54 is then attached to the feed motor 36, shown in FIG. 1, which drives the drive wheel 42. The cylindrical arm shown in FIG. 2 is a one piece unit that is part of the base of the ultrasonic assembly 11. The cylindrical arm as shown moves away from the base unit at a 90 degree angle and then turns back parallel to the base at a 90 degree angle which, as shown in FIG. 1, brings it directly under the horn 14.

Figure 3A:
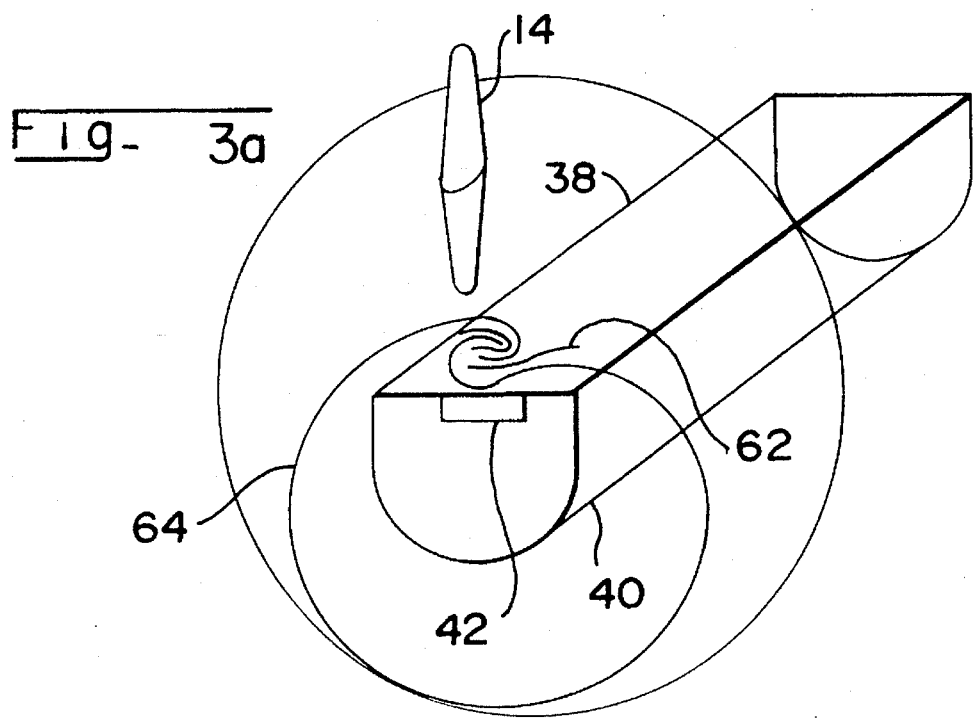
FIG. 3a is a perspective view of the ultrasonic cylinder arm machine of the present invention making a seam in a trouser leg.

FIG. 3a shows a trouser leg 64 which is folded by the folder 62 which is attached on top of the main cover 38 of the extension of the cylindrical arm 40. The drive wheel 42 drives the trouser leg 64 through the folder 62 and into the horn 14. The felled bonded seam shown in FIG. 3b for the trouser leg 64 has the advantage of being double bonded along the axis A—A as shown in FIG. 3b. This permits a stronger seam than the lap weld typically produced with conventional ultrasonic machines. The configuration of the present invention shown in FIGS. 1–3 is the off-the-arm configuration wherein the rotary wheel rotates parallel to the extension of the cylindrical arm.

Figure 4:
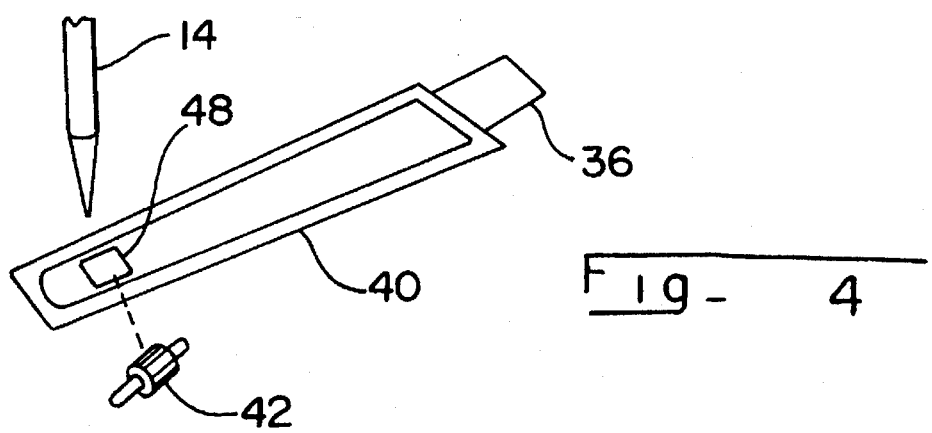
FIG. 4 is a perspective view of the rotary wheel and the cylindrical arm in the around-the-arm configuration of the present invention.

FIG. 4 shows the around-the-arm configuration of the present invention. The rotary wheel 42 is set in the bearing carrier 48 and rotates perpendicular to the extension of the cylindrical arm 40. Like the rotary wheel shown in FIG. 2 which rotates parallel to the extension of the cylindrical arm, the rotary wheel shown in FIG. 4 is directly apart from the horn 14. Because of the different rotation of the around-the-arm configuration shown in FIG. 4, the feed motor 36 is located at the end of the extension of the cylindrical arm 40. The around-the-arm configuration shown in FIG. 4 is especially useful for making shirt sleeves or trouser cuffs.

While a preferred form of the invention has been shown in the drawings and described, since variations of the preferred form will be apparent to those skilled in the art, the invention should not be construed as limited to the specific form shown and described but instead is as set forth in the following claims.

I claim:

1. An ultrasonic cylinder arm machine, having an anvil and a horn, suitable for ultrasonically bonding cylindrical shaped fabrics between said anvil and said horn, comprising:

a. an ultrasonic assembly including said horn;

b. a rigid cylindrical arm extending out away from said ultrasonic assembly and further having an extension of said arm extending back toward said horn of said ultrasonic assembly;

c. a rotary wheel within said arm directly apart from said horn, wherein said rotary wheel and said arm operate as said anvil in said ultrasonic cylinder arm machine;

d. means for driving said rotary wheel.

2. The ultrasonic cylinder arm machine as set forth in claim 1 wherein said rotary wheel is directly under said horn.

3. The ultrasonic cylinder arm machine as set forth in claim 1 wherein the cylindrical arm extension is L-shaped.

4. The Ultrasonic Cylinder Arm Machine as set forth in claim 1 wherein said rotary wheel rotates around an axis and said axis is perpendicular to said cylindrical arm extension extending back toward said horn.

5. The Ultrasonic Cylinder Arm Machine as set forth in claim 1 wherein said rotary wheel rotates around an axis and said axis is parallel to said cylindrical arm extension extending back toward said horn.

6. The ultrasonic cylinder arm machine as set forth in claim 1 further comprising a puller wheel located adjacent to said horn.

* * * * *